(12) United States Patent
Ooi et al.

(10) Patent No.: US 10,315,769 B2
(45) Date of Patent: Jun. 11, 2019

(54) AIRCRAFT-INSTALLED HAND DRYER AND AIRCRAFT LAVATORY UNIT

(71) Applicant: JAMCO Corporation, Mitaka-shi, Tokyo (JP)

(72) Inventors: Kouichi Ooi, Mitaka (JP); Yoshihisa Tsutsui, Mitaka (JP)

(73) Assignee: JAMCO CORPORATION, Mitaka-shi (JP)

( * ) Notice: Subject to any disclaimer, the term of this patent is extended or adjusted under 35 U.S.C. 154(b) by 317 days.

(21) Appl. No.: 15/329,063

(22) PCT Filed: Jul. 29, 2014

(86) PCT No.: PCT/JP2014/069887
§ 371 (c)(1),
(2) Date: Jan. 25, 2017

(87) PCT Pub. No.: WO2016/016938
PCT Pub. Date: Feb. 4, 2016

(65) Prior Publication Data
US 2017/0210473 A1    Jul. 27, 2017

(51) Int. Cl.
| | |
|---|---|
| *B64D 11/00* | (2006.01) |
| *B64D 11/02* | (2006.01) |
| *A47K 10/48* | (2006.01) |
| *B64D 13/08* | (2006.01) |
| *B64D 13/06* | (2006.01) |

(52) U.S. Cl.
CPC .............. *B64D 11/02* (2013.01); *A47K 10/48* (2013.01); *B64D 13/08* (2013.01); *A47K 2210/00* (2013.01); *B64D 2013/0625* (2013.01); *B64D 2013/0629* (2013.01)

(58) Field of Classification Search
CPC . B64D 11/02; B64D 2013/0629; A47K 10/48
See application file for complete search history.

(56) References Cited

U.S. PATENT DOCUMENTS

| | | | |
|---|---|---|---|
| 2006/0150316 A1 | 7/2006 | Fukuizumi et al. | |
| 2011/0271441 A1* | 11/2011 | Bayley | A47K 10/48 4/638 |
| 2012/0210509 A1* | 8/2012 | Dehn | B64D 11/02 4/638 |
| 2015/0059085 A1* | 3/2015 | Seibt | A47K 10/48 4/638 |

(Continued)

FOREIGN PATENT DOCUMENTS

| | | |
|---|---|---|
| JP | 5-154062 A | 6/1993 |
| JP | 6-40399 A | 2/1994 |
| JP | 2006-188902 A | 7/2006 |

OTHER PUBLICATIONS

International Search Report dated Oct. 28, 2014, issued in counterpart International Application No. PCT/JP2014/069887, w/English translation.(2 pages).

(Continued)

*Primary Examiner* — Richard G Davis
(74) *Attorney, Agent, or Firm* — Westerman, Hattori, Daniels & Adrian, LLP

(57) ABSTRACT

An aircraft-installed hand dryer including an air for air conditioning supplied from an air conditioning equipment inside a cabin of an aircraft applied as an air for drying.

3 Claims, 2 Drawing Sheets

(56) References Cited

U.S. PATENT DOCUMENTS

2015/0164289 A1* 6/2015 Courtney ............... A47K 10/48
                                                    34/90
2015/0225932 A1* 8/2015 Figurski .................. A47K 5/12
                                                    4/628

OTHER PUBLICATIONS

Written Opinion dated Oct. 28, 2014, issued in counterpart International Application No. PCT/JP2014/069887, w/English translation. (7 pages).
Notification of Reasons for Refusal dated Jun. 2, 2015, issued in counterpart Japanese Patent Application No. 2015-518682, w/English translation. (6 pages).
Notification of Reasons for Refusal dated Sep. 29, 2015, issued in counterpart Japanese Patent Application No. 2015-518682, w/English translation. (4 pages).
Decision to Grant a Patent dated Dec. 1, 2015, issued in counterpart Japanese Patent Application No. 2015-518682, w/English translation. (6 pages).

\* cited by examiner

AIRCRAFT-INSTALLED HAND DRYER AND AIRCRAFT LAVATORY UNIT

TECHNICAL FIELD

The present invention relates to a hand dryer provided in a lavatory or the like installed in an aircraft.

BACKGROUND ART

An aircraft lavatory unit installed in a passenger aircraft having a hand dryer built therein for drying hands of a user having washed his/her hands by blowing warm air (refer for example to Patent Literature 1).

Such a hand dryer stores a function unit such as a nichrome wire for heating and a fan in an inner portion of a lavatory unit, and an opening communicated from the function unit to an outer portion of the lavatory unit is designed to allow warm air to be blown out from the opening. In a hand dryer having such a structure, it is necessary to heat air using the nichrome wire or blow air by rotating the fan, so that power must be supplied independently to the respective devices.

CITATION LIST

Patent Literature

[PTL 1] Japanese Unexamined Patent Application Publication No. 5-154062

SUMMARY OF INVENTION

Technical Problem

However, since a plurality of facilities such as lavatories are generally provided in a passenger aircraft, and extra power for driving the hand dryers provided in each of the plurality of facilities will be required, the size of the battery must be increased, so that there was a drawback that the use of such dryers in actual aircrafts has not expanded.

The object of the present invention is to provide a hand dryer capable of suppressing the total power consumption of the aircraft, and a lavatory unit having the hand dryer provided therein.

Solution to Problem

In order to solve the above-described problem, the aircraft-installed hand dryer according to the present invention applies an air for air conditioning supplied from an air conditioning equipment inside a cabin of an aircraft to an air for drying.

The aircraft-installed hand dryer according to the present invention can have a valve provided on a supply system for supplying the air for drying, and an air blow of the air for drying can be turned on and off by opening and closing the valve.

Further, the aircraft-installed hand dryer can further have a controller controlling the opening and closing of the valve, and a contactless sensor, wherein the controller can set the valve to an opened state in a state where the contactless sensor detects that an object exists in a vicinity of a nozzle blowing out the air for drying.

Furthermore, the aircraft-installed hand dryer according to the present invention can be applied to an aircraft lavatory unit, for example.

The aircraft lavatory unit described above can further include a faucet supplying water, and a dispenser supplying a washing agent, wherein discharge portions of the faucet and the dispenser can be integrated with a same body portion as the nozzle.

Further, the body portion can have a flat mounting portion provided on an upper surface.

Advantageous Effects of Invention

According to the aircraft-installed hand dryer of the present invention, no additional power consumption for blowing air is required, so that the total power consumption of the aircraft can be suppressed.

DESCRIPTION OF EMBODIMENTS

Figure 1:
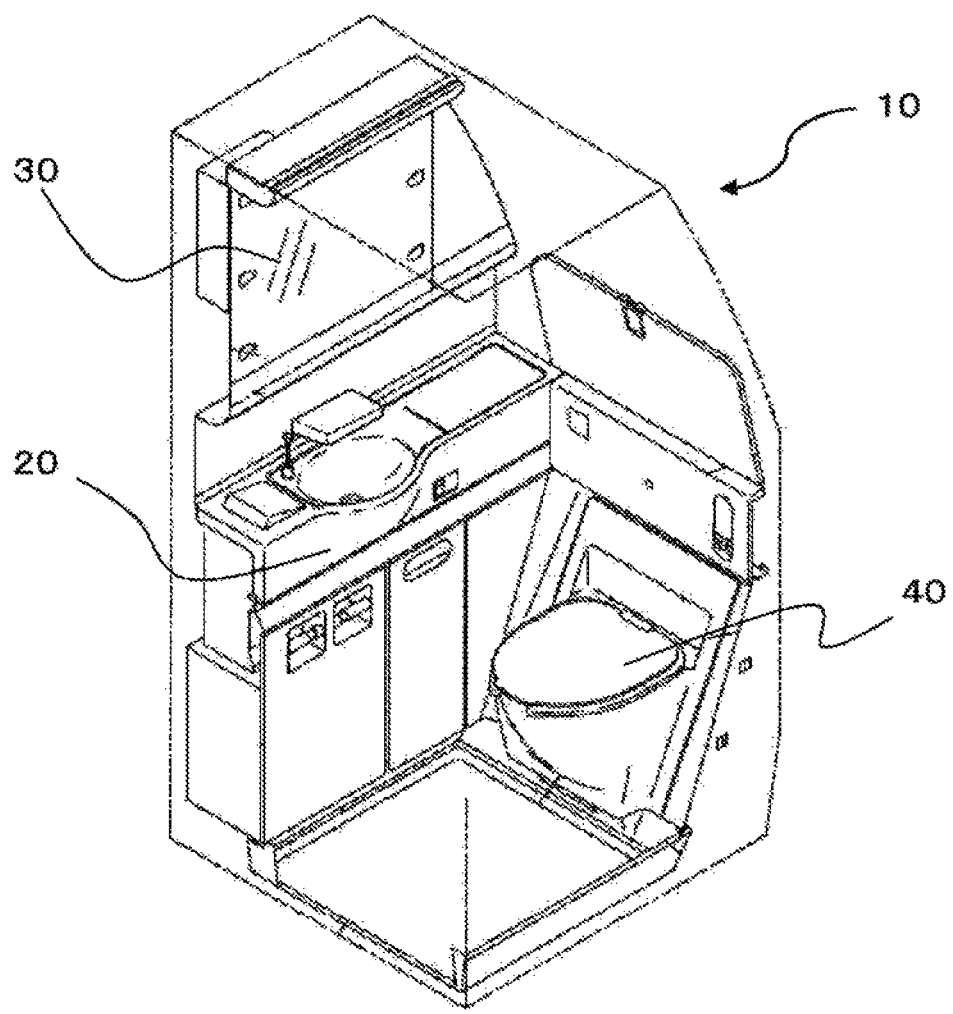
FIG. 1 is a schematic view illustrating a lavatory unit installed in an aircraft.

FIG. 1 is a view illustrating an outline of a lavatory unit installed in an aircraft.

As illustrated in FIG. 1, a lavatory unit 10 installed in an aircraft has a washbasin unit 20, a mirror unit 30 and a toilet unit 40 disposed in an interior thereof.

A hand dryer according to the present invention described later is assembled into the washbasin unit 20, and air for air conditioning is supplied into the lavatory unit 10 from an air conditioning equipment inside a cabin of an aircraft.

Figure 2:
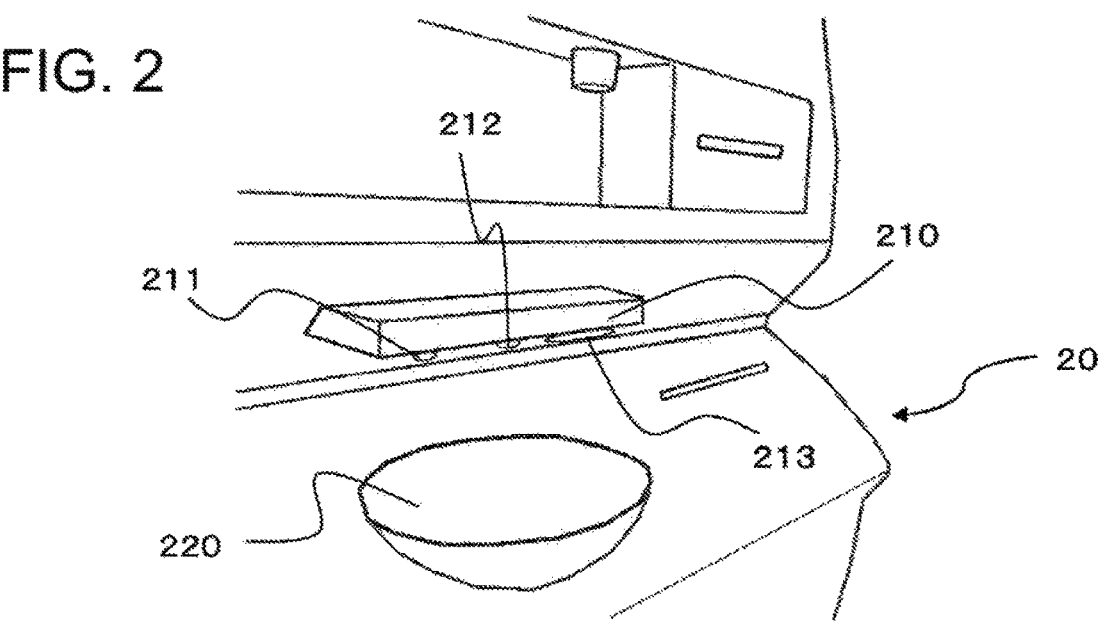
FIG. 2 is an enlarged schematic view illustrating a relevant portion of a washbasin unit 20.

FIG. 2 is an enlarged schematic view illustrating a relevant portion of the washbasin unit 20.

As illustrated in FIG. 2, the washbasin unit 20 includes a faucet unit 210 and a sink 220.

The faucet unit 210 includes a dispenser 211 dispensing soap or other washing agents, a faucet 212 supplying water, and a hand dryer 213 supplying air for drying wet washed hands.

The dispenser 211, the faucet 212 and the hand dryer 213 are respectively equipped with a contactless sensor (not shown), such as an optical sensor or a capacitance sensor, detecting the presence of an object when an object, such as a hand of a user, is placed near the respective devices, so that the washing agent, the water, the air and so on will only be supplied when the object is present.

The water for washing hands, the liquid or foamed soap, and the air for drying can be supplied without the user directly touching the respective devices, by adopting the above-described arrangement. Further, advantages such as enabling to suppress space for placing paper towels and the like and reducing waste can be realized by adopting the hand dryer.

Figure 3:
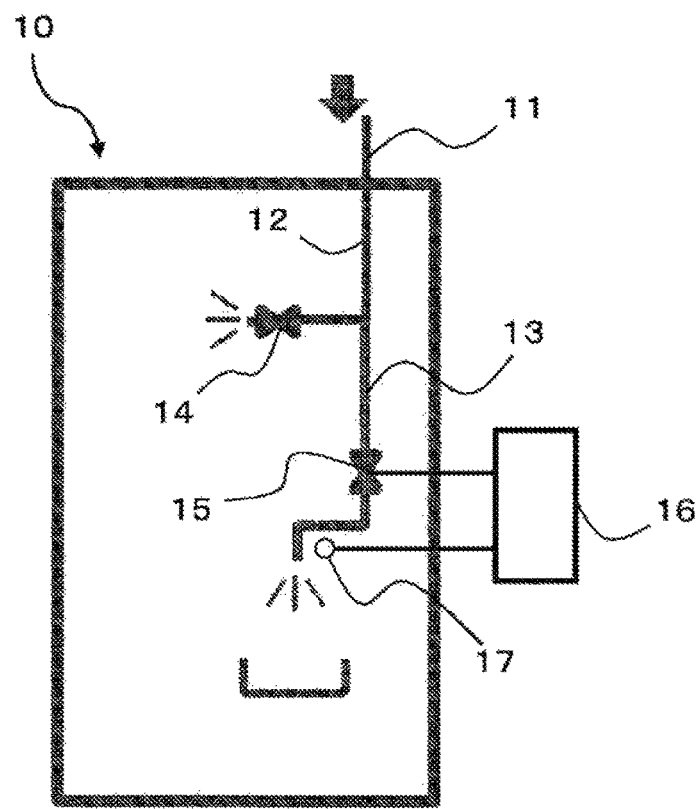
FIG. 3 is a schematic view illustrating a supply system supplying air for drying to a hand dryer according to the present invention.

FIG. 3 is a schematic view illustrating a supply system supplying the air for drying to the hand dryer according to the present invention.

As illustrated in FIG. 3, a supply piping 11 connected to an air conditioning equipment on board the aircraft is introduced to the lavatory unit 10 from the outside, and air for air conditioning supplied from the air conditioning equipment (gasper air) is supplied into the piping.

The supply piping 11 is branched into a lavatory air conditioning piping 12 and a hand dryer piping 13 within the lavatory unit 10, and the respective piping is connected to an air outlet (not shown) within the lavatory unit and to the hand dryer 213 illustrated in FIG. 2.

Further, valves 14 and 15 are respectively disposed on the piping 12 and 13, and based on the command from a controller 16, the valves operate to adjust the supply quantity of air for air conditioning within the lavatory or switch the on and off of the hand dryer.

As described with reference to FIG. 2, a contactless sensor 17 is provided on the hand dryer 213.

While the sensor 17 detects the presence of an object, the output from the sensor 17 is transmitted to the controller 16, and air for drying is supplied from the hand dryer 213 by the controller 16 issuing an on command to the valve 15.

By adopting such configuration, the air for air conditioning can be diverted without any modification as the air for drying supplied to the hand dryer, so that there is no need to provide additional air blower means or heating means for the air for drying, and as a result, the power consumption of the whole aircraft can be suppressed since there is no additional power consumed for blowing air.

Further, by detecting the on and off of the hand dryer using a contactless sensor, power consumption other than in a state where power is required can be suppressed, and there is no need for the user to touch a switch or the like with his/her washed hands, so that this configuration is also advantageous from the viewpoint of sanitation.

In the example described above, the faucet, the dispenser and the hand dryer are integrated to a single faucet unit, but it is possible to provide the discharge outlets on independent members and arrange the outlets at different positions.

Moreover, since the upper surface of the faucet unit is configured as a flat mounting space, a space for placing small articles such as cosmetics and pouches can be ensured.

REFERENCE SIGNS LIST

10 Lavatory unit
11 Supply piping
12 Piping for lavatory air conditioning
13 Hand dryer piping
14, 15 Valve
16 Controller
17 Sensor
20 Washbasin unit
210 Faucet unit
211 Dispenser
212 Faucet
213 Hand dryer

The invention claimed is:

1. An aircraft lavatory unit comprising a supply piping connected to an air conditioning facility inside a cabin of an aircraft, an aircraft-installed hand dryer using an air for air conditioning supplied from the supply piping as an air for drying, a faucet supplying water, and a dispenser supplying a washing agent, wherein discharge portions of the faucet and the dispenser are integrated with a same body portion as the nozzle of the aircraft-installed hand dryer, and the body portion has a flat mounting portion provided on a whole area of an upper surface thereof.

2. The aircraft lavatory unit according to claim 1, comprising a valve provided on the supply piping, wherein an air blow of the air for drying is turned on and off by opening and closing the valve.

3. The aircraft lavatory unit according to claim 2, further comprising a controller controlling the opening and closing of the valve, and a contactless sensor, wherein the controller sets the valve to an opened state in a state where the contactless sensor detects that an object exists in a vicinity of a nozzle blowing out the air for drying.

\* \* \* \* \*